United States Patent
Opaterny

(10) Patent No.: US 8,250,125 B2
(45) Date of Patent: Aug. 21, 2012

(54) MULTIHIERARCHY CONTROL

(75) Inventor: Thilo Opaterny, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1469 days.

(21) Appl. No.: 11/114,399

(22) Filed: Apr. 26, 2005

(65) Prior Publication Data

US 2005/0246356 A1    Nov. 3, 2005

(30) Foreign Application Priority Data

May 3, 2004   (EP) ..................................... 04010497

(51) Int. Cl.
*G06F 17/30*   (2006.01)
(52) U.S. Cl. ....................................................... 707/829
(58) Field of Classification Search .................. None
See application file for complete search history.

(56) References Cited

U.S. PATENT DOCUMENTS

| | | | |
|---|---|---|---|
| 5,953,724 A * | 9/1999 | Lowry | 707/102 |
| 6,147,687 A * | 11/2000 | Wanderski | 715/853 |
| 6,236,988 B1 * | 5/2001 | Aldred | 707/3 |
| 6,496,208 B1 * | 12/2002 | Bernhardt et al. | 715/853 |
| 6,785,667 B2 * | 8/2004 | Orbanes et al. | 707/1 |
| 2001/0004260 A1 * | 6/2001 | Bauer et al. | 345/418 |
| 2002/0030703 A1 | 3/2002 | Robertson et al. | 715/853 |
| 2004/0036698 A1 | 2/2004 | Thurner et al. | 345/619 |
| 2006/0085765 A1 * | 4/2006 | Peterson et al. | 715/853 |
| 2006/0239144 A1 * | 10/2006 | Gotoh et al. | 369/47.27 |

* cited by examiner

*Primary Examiner* — Neveen Abel Jalil
*Assistant Examiner* — Kellye Buckingham

(57) ABSTRACT

The invention relates to a system and a method for easily switching between a number of sets (1) of objects (2) each mapped by means of a hierarchical structure. In this case the interrelationships of the objects (2) are typically presented in a tree structure. A transition point (3) can be used to switch between the individual different trees which represent the different interrelationships of the objects (2).

19 Claims, 2 Drawing Sheets

FIG 2
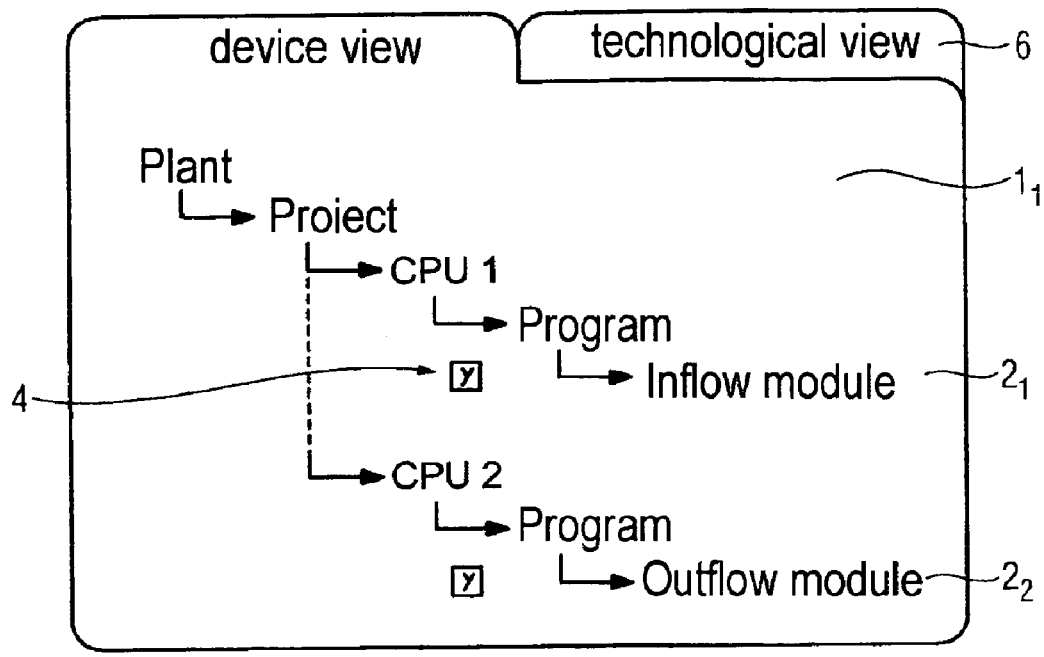
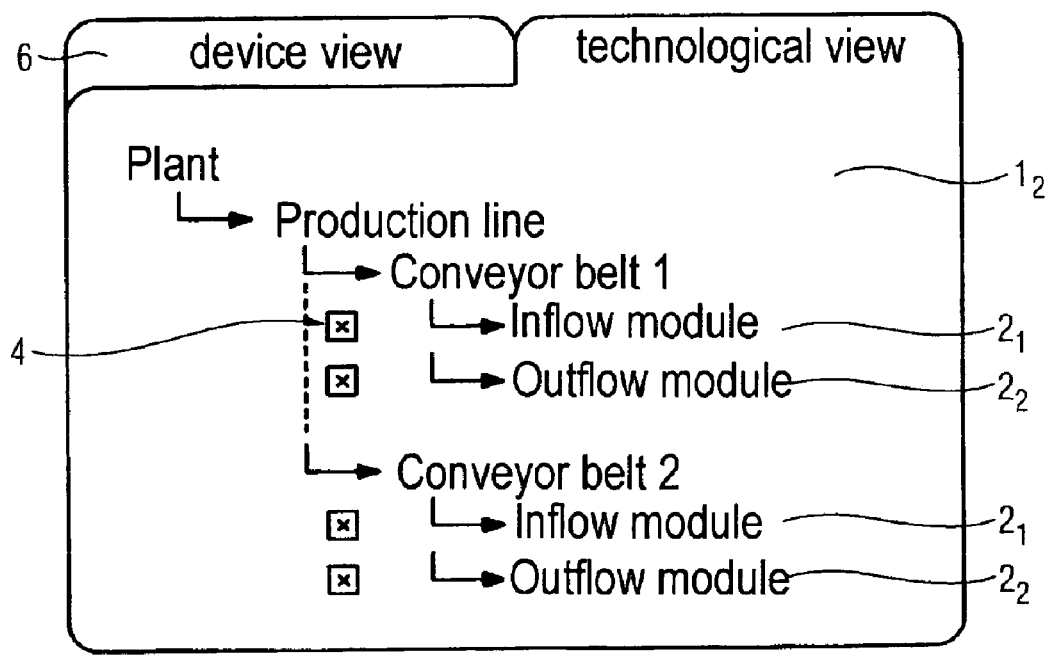

MULTIHIERARCHY CONTROL

CROSS REFERENCE TO RELATED APPLICATIONS

This application claims priority to the European application No. 04010497.8, filed May 3, 2004 and which is incorporated by reference herein in its entirety.

FIELD OF INVENTION

The invention relates to a system and a method for graphical presentation of a number of subsets from an overall set of objects.

SUMMARY OF THE INVENTION

As a rule objects which are elements of sets have relationships to one another. Hierarchies are used as a rule to structure the relationships of the objects to one another. A typical example of such hierarchies are file systems in computers. Each file has a name but this name is only unique within the directory in which the file is stored. Within a system of a number of files which are stored in a number of directories a file name can be assigned to a file more than once. The set of available files is structured here by the directories which are arranged in a specific hierarchy to each other. Here a directory can contain a number of files.

Likewise the administration of objects can be structured as elements of sets. In this case-each object also has a name. An object here can be a file or also a directory assigned to a higher hierarchy level. In this structure each object or each file of a system can be addressed by specifying a path. As a rule these types of hierarchies are presented graphically by using a tree structure. It has been shown that this makes it easier for a user to select a file from the corresponding set of files.

This type of tree presentation can be used for all hierarchical systems. For example for parts lists which are used within the framework of a production process. Parts lists are hierarchies in this case. For example an automobile consists of many parts and during assembly small parts are combined to form larger parts. For example a set of gear wheels and shafts produces a transmission. The parts already combined will be combined with other larger parts to form even larger units. For example a transmission, a clutch and a cylinder block produce an engine. As explained an auto parts list can be presented as a tree. In this case the small parts such as gearwheels and shafts are presented as leaves of the tree. These leaves of the tree are as a rule parts which are purchased by the manufacturer.

For a buyer in the company's purchasing department a higher-level in the hierarchy, for example the transmission, is now not of interest. A buyer is only interested in the leaves of the tree, that is the parts which have to be purchased. In this case it is of no interest to the buyer which of these purchased parts have to be combined to form a higher-ranking unit, i.e. a larger part, but rather it is of interest to the buyer to structure these leaves of the tree, in accordance with suppliers for example. If the manufacturer has a supplier of gear wheels for example which are however not just used within a transmission but are fitted at other points within an automobile, the buyer is interested in all leaves of the tree which represent gear wheels. He would like to structure the leaves of the tree, that is the objects, in accordance with suppliers.

A further hierarchy, structured in a different way, is for example of interest in production. In this case parts, i.e. objects, are structured in accordance with assembly locations at which the parts will be put together. This type of structure differs from the two mentioned previously since it can well be that a number of assembly steps are executed at one place and also that the assembly is distributed over more than one location.

The examples given show that, during a production process in particular, there are a quantity of parts which are presented as objects within the framework of a software automation solution and are arranged in a number of different but interdependent hierarchies. A tree structure such as that already mentioned above can however only ever present one hierarchy. For each of the applications given in the example a separate tree must thus be created and it is not possible to find out the position at which an object is arranged or positioned in the corresponding other tree. The observer of a tree and thereby of a hierarchy structure does not thus obtain any information about the environment and the relationships with which an object occurs in the other hierarchy structure.

The object of the present invention is thus to specify a system with the aid of which objects which are present in a number of hierarchies can be presented in a simple manner, so that convenient navigation between the various hierarchies is possible.

The object is achieved by a system for graphical presentation of a number of subsets from an overall set of objects, in which the objects of a subset are provided for presentation in their relevant hierarchical relationship to each other, with at least one object occurring in at least two subsets and being embodied as a transition point between the presentations and with an identifier being provided for the membership of the subsets by objects forming the transition point.

Furthermore the object is achieved by a method for graphical presentation of a number of subsets from an overall set of objects, in which the objects of a subset are presented in their relevant hierarchical relationship to each other, with at least one object occurring in at least two subsets and forming a transition point between the presentations of the subset, and with the membership of the subsets by the objects forming the transition points being identified.

The invention is based on the knowledge that things or objects from widely differing areas of life as a rule features different relationships to one another and that these relationships (objects belonging to a greater extent to one set of objects in relation to a second set of objects) can be presented in the form of hierarchical structures. In this case the individual objects which are contained in these sets are under some circumstances, depending on how they are considered, grouped differently to one another. This means that the hierarchically structured objects occur in different hierarchies depending on how they are considered. Here the relationship of the objects in a first hierarchical structure is other than it is in a second hierarchical structure.

The objects to be arranged hierarchically can be parts which for example are needed for the production of an automobile, as described in the example given at the start. In this case the parts are arranged hierarchically in the form of parts lists. The objects can however also be files or software modules, such as those needed within the framework of an engineering system for creation of an automation solution for manufacturing and/or process automation.

The parts of the parts list, the given files or also the software modules mentioned are structured here in different hierarchies with different interrelationships to allow different views of the overall set of parts or files or software modules as required.

In this case a set of parts or files or software modules occur in a number of hierarchical structures. To enable the relationship of such an object (part in a parts list, file, software module) in the relevant hierarchy to the other objects involved to be viewed, a user must navigate within the relevant hierarchy and can recognize the hierarchical structures. This means that within a hierarchy a user can recognize as such those objects which together belong to a subunit. However in a further hierarchy the corresponding objects occur in a completely different position under some circumstances. A user would thus have to navigate around in a second hierarchy until such time as he had found the corresponding object of his choice, about which information is needed. A connection between the hierarchies which makes it possible for the user to access a corresponding object directly does not currently exist.

It is thus advantageous for a user if, starting from a hierarchical structure in which he is currently located, he can obtain information directly about an object that he is currently looking at there regarding its position and the relationship to neighboring objects in another hierarchy. For this reason the present invention makes it possible for the user to switch from a hierarchy, i.e. from a tree structure for example, via a selected object directly to a second hierarchy and to have the relationship of the object and its environment in this hierarchy presented to him as well. Especially advantageous here is that the user does not have to waste time searching in a further hierarchy for the object and its position there. In this way a user of this type of system can easily view different hierarchy structures.

Common objects here are embodied as transition points between the different hierarchies. This means that when a user has selected and looked at this type of common object an identifier preceding the corresponding object is used to visualize that this object is also contained in the corresponding other hierarchies and can be looked at there as well. In each of the different hierarchy structures the corresponding identifier thus shows precisely which objects occur in which other hierarchies, and objects which are contained in a number of hierarchies are correspondingly embodied as transition points to switch between the hierarchies.

A further advantageous embodiment of the invention is characterized in that the presentation of the relevant hierarchical interrelationship between the objects is provided in the form of a tree structure. This form of hierarchical presentation of the structures provides the user of the corresponding system with a familiar and generally also a known form of presentation. With the aid of trees, which represent directed, contiguous cycle-free graphs, any given hierarchy between objects involved can be presented. In this case the tree features a root and then any number of branches down to the leaves. The individual objects, in the example the parts list for automobile manufacturing, that is the individual parts to be built in or supplied, are the leaves of the tree here. These parts or objects are then grouped together in different levels to form ever more complex units.

In these cases the grouping of the parts differs depending whether a number of parts are to be grouped to form a larger part, a number of parts are possibly to be ordered from one supplier or a number of parts must be available at a particular assembly point. The use of the tree structure is especially advantageous since the membership of subordinate sets can be intuitively recognized immediately by a user of the system.

A further advantageous embodiment of the system is characterized in that specific signs are provided to identify the fact that the objects belong to each subset. This specific identification of the assignment enables the user to immediately recognize the other hierarchy structures in which the corresponding object is contained, where two or more are present. In this way it is easy to visualize the context in which the corresponding object is only ever relevant and the context in which it is only ever to be looked at in relation to other objects.

A further advantageous embodiment of the system is characterized in that switching between the presentations of the subsets by activating an object embodied as a transition point by a user of the system is provided. Simple switching between the hierarchy presentations is made possible in this way. If for example a user recognizes that an object is embodied in a number of hierarchical structures because the corresponding specific sign is attached to the object, he can simply switch between the hierarchy levels by for example selecting the object and/or clicking on the corresponding sign which is inserted before the object. In this way a change of presentation is created by a user making an active selection, and the user subsequently sees the hierarchical, presentation which he has selected through his activation. This means that the user can directly look at the relationships of an object to neighboring objects in different hierarchical structures, without having to make his way in each case via an entry via the root in to the other hierarchy level to the corresponding object.

A further advantageous embodiment of the invention is characterized in that a switch between the presentations of the subset is made in such a way that an object already selected remains selected. If a switch is created by activating an object embodied as a transition point not only is the object shown in its environment in the new hierarchical structure, but the object also remains selected as such for the user. For further processing of the corresponding objects the object does not thus have to be activated or selected once more by the user. In the new hierarchy structure the object is directly available to the user.

A further advantageous embodiment of the system is characterized in that there is provision for the user to switch between the presentations of the subsets by selecting a tree representing another subset via a tab bar. It is advantageous here that the user cannot just switch via the objects embodied as transition points but that he can primarily also enter directly into another hierarchy entirely. In this case it is made possible for the user to switch by using a tab bar to directly select the other tree in which the objects are arranged for example. It is advantageous here that the user is provided with a switch option here which is known to him for its usability. In addition the corresponding tab bar simultaneously visualizes to the user how many hierarchy structures or subsets are present in the system overall. The number of hierarchy structures would not be directly visible from the tree since not all objects must be present in all hierarchies and the user would therefore have to go through the complicated process of using the corresponding signs before the transition points to obtain an overview of the hierarchy structures or subsets present. By contrast the tab bar means that this overview is provided immediately.

A further advantageous embodiment of the invention is characterized in that a switch between the presentations of the hierarchy structures or subsets is undertaken such that an object already selected remains selected if it is contained in a new subset, or the next transition point of the new subset lying on the path to the root is selected when the original selected object is not present in the new subset. For a switch between the hierarchies using the tab bar, when an object is present in both hierarchies or subsets, the corresponding selection of the object is retained. As with a switch via the activation of the corresponding character before the transition points, there is also a guarantee in this case that an object already selected is available to the user for further processing.

If however the corresponding object in the new hierarchy which the user has selected via the tab bar is not present, an automatic branch is made in the system to the next transition point of the tree lying on the path to the root and this automatically becomes the selected element. A user can thus immediately recognize that the object is not present in the corresponding hierarchy and by the jump to the next transition point further navigation is made easier for the user since a defined starting point which is as close as possible to the original object is available for further operation.

Alternatively for a switch between the subsets, if the originally selected object is not contained in the new subset, the branch can also be made to the root of the new subset.

The invention is described and explained in more detail below on the basis of the exemplary embodiments shown in the Figures.

BRIEF DESCRIPTION OF THE DRAWINGS

FIG. 2 shows a typical application from the automation technology sphere.

DETAILED DESCRIPTION OF THE INVENTION

Figure 1:
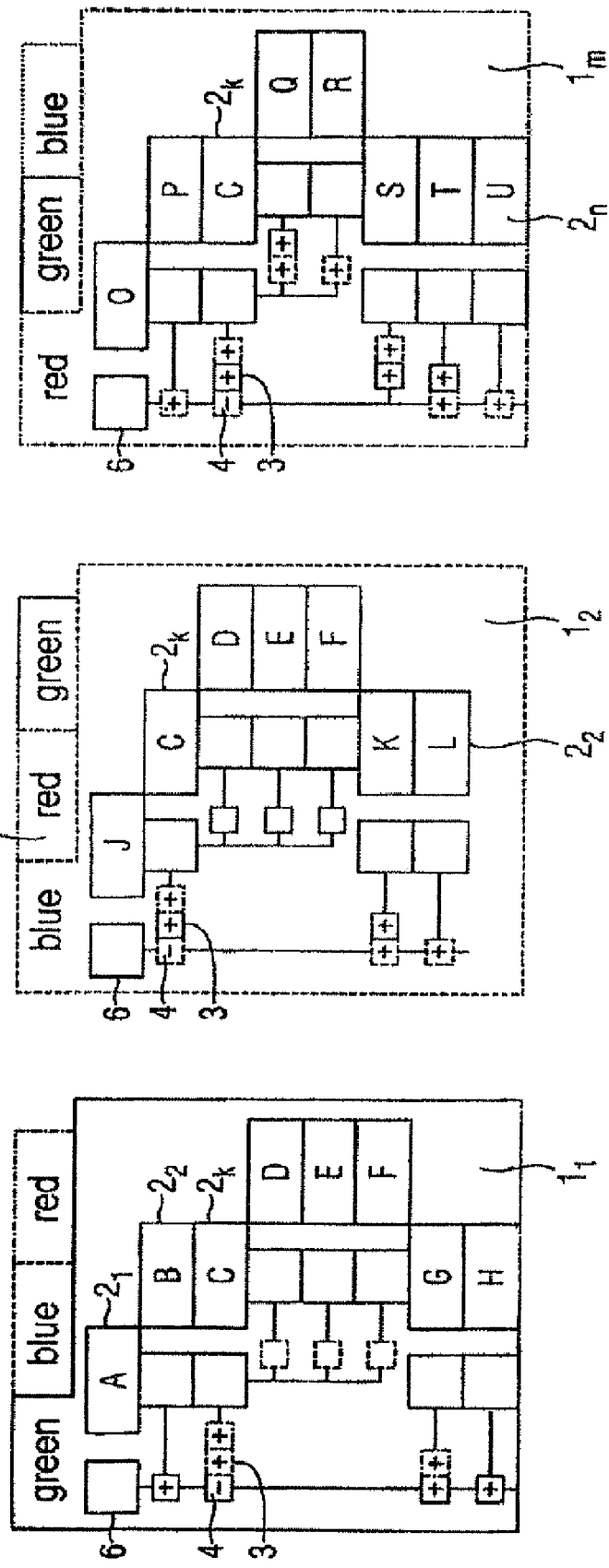
FIG. 1 shows a schematic diagram of the system for the presentation of different structured hierarchies.

FIG. 1 shows a system for representing the relationships between a set of objects $2_{a \ldots u}$ and their interrelationships in different subsets $1_{1 \ldots m}$. In this case a first structure of the elements or objects $2_{a \ldots t}$ is mapped in subset $1^1$. the objects $2_{a \ldots t}$ are structured, according to where they belong, in different hierarchies. In this case the structure of the objects $2_{a \ldots t}$ is for example visualized with the aid of a tree structure ($2_t$ is not shown in subset $1_1$ since the diagram is truncated at the bottom)

Further objects $2_{j \ldots l}$ are shown in a second subset $1_2$. The relationships of the objects $2_{j \ldots l}$ is once again visualized by a hierarchical tree structure. Here a few objects $2_c$, $2_d$, $2_e$, $2_f$ occur both in subset $1_1$ and also in subset $1_2$. Other objects, for example the object $2_1$ occur only in subset $1_2$.

A third subset $1_m$ shows the structural relationship of a further set of objects by means of a tree. Both objects from subset $1_1$ and from subset $1_2$ occur in subset $1_m$, but in subset $1_m$ there are also objects which do not occur in any of the other subsets.

Objects which occur in at least two subsets are implemented as transition points 3 between subsets $1_{1 \ldots m}$. In this case the transition points 3 are visualized by means of sign 4, with a sign precedes an object $2_{a \ldots u}$ specifying in which further subsets $1_{1 \ldots m}$ apart from the active subset the object is present. Here the sign 4 can be embodied in color and the corresponding subset $1_{1 \ldots m}$ is also highlighted against a corresponding background color. The signs 4 can however be embodied in other ways, for example as numeric codes or using symbols, with the symbol specifying in which of the further subsets $1_{1 \ldots m}$ the object occurs in each case.

Furthermore it can be visualized within or in the environment of sign 4 whether further hierarchy levels are hidden behind the object presented. This can be done for example using a plus sign in a box. The objects of the lowest hierarchy level, the so-called leaves of the tree, are assigned a sign in any event in the hierarchical graphical presentation of a subset if they are also present in another subset. For example the objects 2.sub.d, 2.sub.e and 2.sub.f in subset 1.sub.1 feature a sign which indicates that the same objects are also contained in subset 1.sub.2.

A user of the system can now navigate as required within the tree structure of a first subset $1_1$ and move through different hierarchy levels. In this case a sign before the objects of the individual hierarchy levels indicates in each case in which further subset the corresponding objects are contained and whether further hierarchy levels are arranged behind them. If a user now wishes to look at the hierarchical environment of a selected object in another subset, he can for example select the other subset directly via the tab bar 5 and is shown the corresponding environment of the object there. At the same time an object that has been selected once remains selected and is thus available directly for the actions of the user. The user can also, by activating the transition point 3, for example by clicking on the corresponding sign 4, switch to the other hierarchy structure in each case, i.e. the other subset.

This type of system, which is referred to as a multihierarchy control, can be implemented for example in the environment of ERP systems. Using the example of the parts list for automobile building a hierarchy generated from the parts list for a business administrator can be implemented as a further subset. In this case the objects, that is the parts, are structured in accordance with suppliers. A supplier here offers a set of parts, i.e. objects, and an object can be offered by a number of suppliers. In such a case for example the distance to the supplier is a relevant criterion since costs are concealed in the distance. For purchasing for example a tree can thus appear as follows:

At the topmost hierarchy level there are distance regions followed by the suppliers and the parts which are of interest for manufacturing are only in the lowest part. In this case however the parts delivered by a supplier are used in different contexts within the framework of building an automobile and thus occur in another hierarchy structure, i.e. in another subset at another point. The user of the system can however easily switch between the hierarchies and thus always sees the environment, depending on the requirement, installation or costs, into which the corresponding part or object is embedded.

Tab bar 5 can be used to switch between the hierarchical structures, i.e. between the subsets. If a user switches from a subset $1_1$ into a second subset $1_2$ and if an object $2_b$ is not present in a subset $1_2$ when this is done, the root 6 of the newly selected subset $1_2$ is selected automatically after the switch. From here the user can navigate through the corresponding hierarchy in the normal way.

FIG. 2 shows a specific application within the context of an automation technology system. In the exemplary embodiment shown, two views exist for project planning of a plant by means of an engineering system:

One is the device view shown in subset $1_1$ and one the technological view shown in subset $1_2$. For project planning of the plant $1_1$ software modules $2_1$, $2_2$ from a software module library (in this case for example an inflow module and an outflow module for a conveyor belt) are used in the device view. A number of software modules of this type are combined to form a program which runs in a CPU. A number of programs are combined to form a project in the project planning and a number of projects form the plant. In the exemplary embodiment shown an inflow module $2_{in}$ is assigned to CPU 1, meaning that it runs within a program on this CPU while the outflow module $2_{out}$ is assigned to a further CPU, CPU 2.

In the real plant environment the two modules, the inflow module $2_{in}$ in and the outflow module $2_{out}$ are however structurally more closely linked to each other than it would appear from the hierarchical view, which is reflected in the device view. For example the inflow module $2_{in}$ controls the delivery of material on a conveyor belt while the outflow module $2_{out}$ controls the removal of corresponding materials at the end of the conveyor belt. The two software modules thus almost flank a conveyor belt which does not itself appear within the framework of the device view in the project planning of the plant. To obtain an overview of the structural relationships of the two software modules $2_1$ and $2_2$ a switch can now be made to the technological view which is presented in subset $1_2$. Here a user of the system immediately sees that for example two conveyor belts 1 and 2 are planned for the project, with each conveyor belt having an inflow module $2_{in}$ and an outflow module $2_{out}$. The modules $2_{in}$, $2_{out}$ arranged in separate hierarchies in the device view are thus arranged in the technological view structurally closer to one another. Furthermore it is immediately evident that the same modules are used a number of times in the technological view.

The switch between the different views and thereby between the subsets $1_1$ and $1_2$ is undertaken by activating, i.e. clicking on the sign 4. In this case in the exemplary embodiment shown the Y as sign 4 in subset $1_1$ is intended to visualize that the corresponding software module or the object $2_{in}$, $2_{out}$ also occurs in subset $1_2$, while the X as sign 4 in the technological view visualizes that the corresponding module occurs in the device view (subset $1_1$).

The multihierarchy controls also make possible automatic assignment, for example of the software modules used to the corresponding devices (CPUs) in the instantiation of the technological view.

A corresponding process visualization of different hierarchical structures within the context of an automation system is conceivable not only for the engineering of an automation solution within the framework of production automation, but also within the environment of the process automation. Here one could for example imagine that in a hierarchical structure, that is in a subset, a vessel with inflows, outflows, valves and measured process values, for example pressure, temperature etc. is shown. In a further view by contrast the pressure of a number of vessels and the pressure-in the lines connecting the vessels can be mapped.

To summarize, the invention relates to a system and a method for simple switching between a number of sets 1 of objects 2 each mapped by means of a hierarchical structure. In this case the interrelationships of the objects 2 is presented for example in a tree structure. A switch can be made by means of a transition point 3 between the different trees, which represent different relationships of the objects 2 to each other.

The invention claimed is:

1. In a system of the type including a CPU and software modules for execution thereon, a method of providing at least first and second views of a first data object in association with other data objects within a framework of a production system, each of the views corresponding to a different hierarchical data structure, the method comprising the steps of:
   providing a set of objects, wherein objects are part objects within said framework of said production system;
   forming from the set of objects a first hierarchical structure containing the first data object;
   forming from the set of objects a second hierarchical structure different from the first hierarchical structure and containing the first data object;
   providing a view of the first object in the context of the first hierarchical structure; and
   wherein the viewed first object serves as a user selectable linking point of transition between the first and second hierarchical structures so that activating the first object location viewable while viewing the first hierarchical structure switches to a view of the second hierarchical structure which view includes the first object, wherein the first hierarchical structure is an organization of a first subset of the set of objects and the second hierarchical structure is an organization of a second subset of the set of objects which is different from the first subset.

2. The method of claim 1, wherein when the first object is activated an identification is provided as to membership of the first object in each of the first and second hierarchical structures, and wherein a view of the first object in one of the hierarchical structures is provided in the form of a tree structure.

3. The method in accordance with claim 1, wherein signs to identify membership of one or more of the objects in each hierarchical structure are provided in the views of the hierarchical structures.

4. The method in accordance with claim 1, wherein there is provision for a user of the method to switch between views of the hierarchical structures by activating any object present in both hierarchical structures as a transition point between views of the two hierarchical structures.

5. The method of claim 1, wherein switching between views of the first and second hierarchical structures is effected by selecting the first object and after the view is switched the first object appears selected in the view of the second hierarchical structure.

6. The method of claim 1, wherein switching between views is made by a user using a tab bar to select a tree representing the second hierarchical structure.

7. The method in accordance with claim 6, wherein a switch between the hierarchical structures is made in such a way that an already selected object remains selected if it is contained in the second hierarchical structure or that the next transition point of the second hierarchical structure lying on the path to the root is selected if the original selected object is not
   present in the second hierarchical structure representations.

8. A method for graphical presentation of a plurality of representations of different hierarchical structures, each formed with objects in a set, within a framework of a production system, wherein some of the objects in one representation are also in another representation, comprising:
   providing a set of objects, wherein objects are part objects within said framework of said production system;
   providing an object present in two or more of the different hierarchical structures as a user selectable transition point between the two different hierarchical structures enabling a user to switch views between the representations by selecting the object location as viewable in one of the hierarchical structures so that the transition point is formed by the object's presence occurring in at least two representations; and
   providing an identification indicating, for the object viewable in one representation, other representations in which the object is viewable.

9. The method of claim 8, wherein for at least one representation the relevant hierarchical relationship of the objects to each other is accomplished by a tree structure.

10. The method of claim 8, wherein symbols for identifying the memberships of the objects in each representation are provided in views of the hierarchical structures.

11. The method of claim 8, wherein a user of the method can switch views among the representations by selecting and activating the object formed as the transition point.

12. The method of claim 11, wherein switching between the representations is made such that the already selected object remains selected after switching views.

13. The method of claim 8, further comprising providing a plurality of selectable tabs for switching between the representations.

14. A method for graphical presentation of a number of different hierarchical structures, each formed from a set of objects, within a framework of a production system, comprising:

providing a set of objects, wherein objects are part objects within said framework of said production system;

presenting a view of the objects in each of at least first and second different hierarchical structures with relative hierarchical relationships among some or all of the objects in each structure being viewable so that each view depicts at least a portion of one of the different hierarchical structures; and providing an object present in the first and second hierarchical structures as a user selectable transition point for switching between the views of the two different hierarchical structures, wherein the transition point is effected by selecting an object location as viewable in one of the hierarchical structures such that the transition point is formed by the object's presence occurring at locations in the two different structures.

15. The method according to claim 14, wherein presentation of the views of the hierarchical relationships among objects is accomplished in the form of a tree structure.

16. The method according to claim 14, further comprising: identifying membership of objects in multiple ones of the different hierarchical structures by providing a specific sign or symbol in the views of the hierarchical structures.

17. The method according to claim 14, wherein an object selected in one presentation appears selected in a second presentation when a switch is made between views.

18. The method according to claim 14, wherein a user can switch between views by selecting a tree representing a different hierarchical structure.

19. The method according to claim 18, wherein, when switching of views is made between the first and second different hierarchical structures an object selected in the first view appears selected in the second view if it is in the second hierarchical structure or, otherwise, a next transition point for switching between the views, lying on a path to the root, appears selected when the formerly selected object is not present in the new subset.

* * * * *